No. 784,905. PATENTED MAR. 14, 1905.
R. G. TROWBRIDGE.
COIN CONTROLLED DISPENSING APPARATUS.
APPLICATION FILED OCT. 19, 1903.

Witnesses:
H. S. Gaither
I. C. Lee

Inventor:
Roy G. Trowbridge.
by A. Miller Belfield
atty

No. 784,905. Patented March 14, 1905.

UNITED STATES PATENT OFFICE.

ROY G. TROWBRIDGE, OF CHICAGO, ILLINOIS.

COIN-CONTROLLED DISPENSING APPARATUS.

SPECIFICATION forming part of Letters Patent No. 784,905, dated March 14, 1905.

Application filed October 19, 1903. Serial No. 177,572.

*To all whom it may concern:*

Be it known that I, ROY G. TROWBRIDGE, a citizen of the United States, residing at Chicago, in the county of Cook and State of Illinois, have invented a certain new and useful Improvement in Coin-Controlled Dispensing Apparatus, of which the following is a full, clear, concise, and exact description, reference being had to the accompanying drawings, forming a part of this specification.

My invention relates to coin-controlled dispensing apparatus for dispensing liquids of various kinds.

Prominent objects of the invention are to provide a simple, practical, and inexpensive form of machine, to arrange for the automatic operation of the same, to prevent tampering with the machine and also to prevent operating it without the use of a coin, and to secure the foregoing results in a practical and efficient manner.

Figure 1:
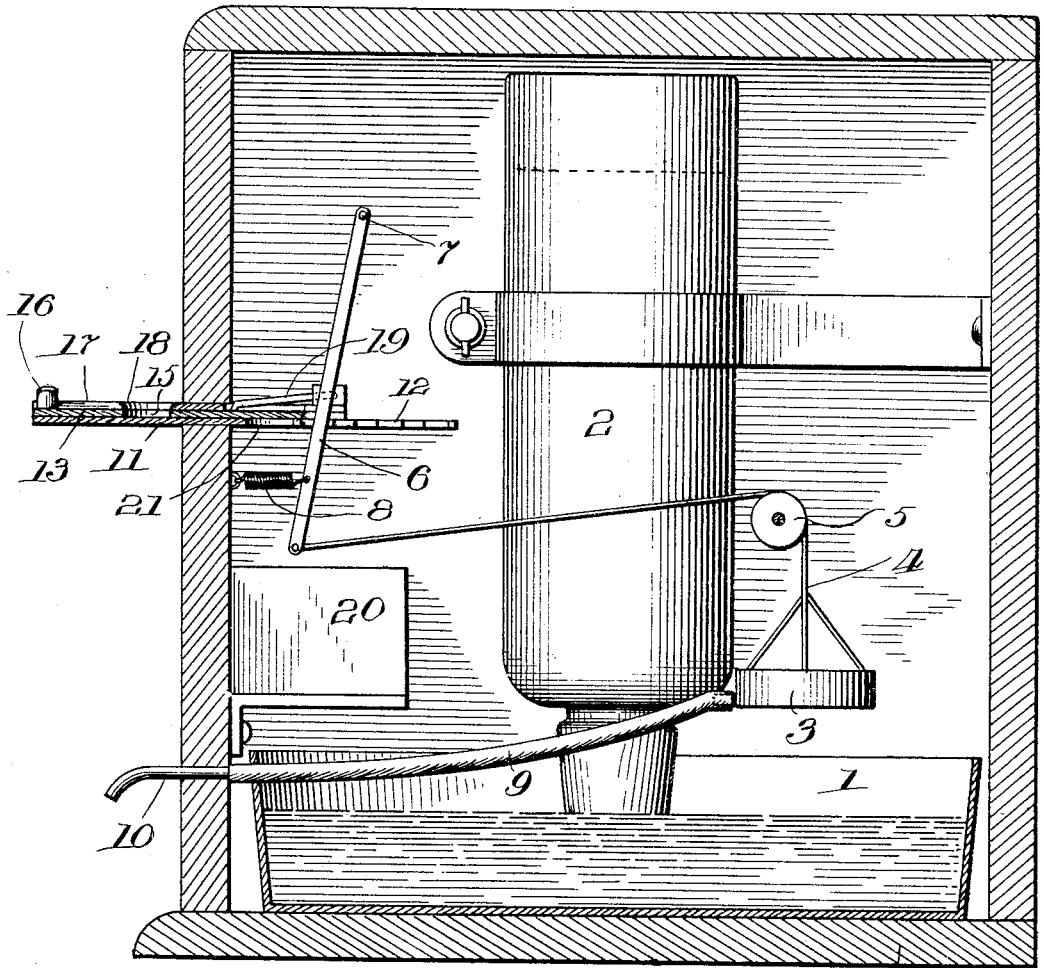
Figure 2:
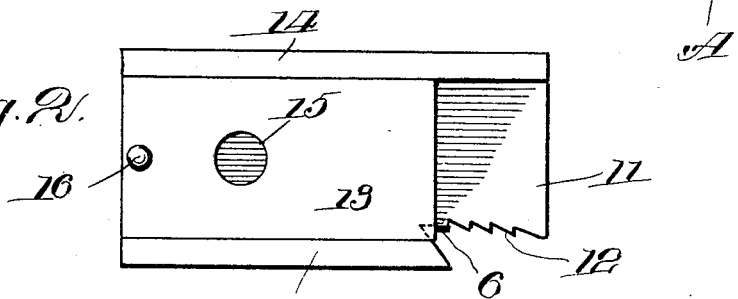

In the drawings, Figure 1 is a vertical section of a machine embodying my invention. Fig. 2 is a plan view of a portion of the same.

Referring to Fig. 1, A indicates a suitable case for the machine, which case can be of any desired or preferred construction, that shown being preferably of wood in a generally rectangular form. A pan or reservoir 1 for the liquid to be dispensed rests upon the case A. This pan 1 can be of metal or glass or other material. A bottle 2, also containing liquid to be dispensed, is suspended in an inverted position above the pan 1 with its neck within the pan. By this arrangement the level of the liquid in the pan is maintained substantially constant, any liquid being withdrawn from the pan being replaced by liquid from the bottle. A cup 3 is suspended from a cord or other flexible connector 4, which latter is carried about a pulley 5 and extended thence forwardly. Its forward end is connected to the lower end of a lever 6, which is pivoted at its upper end at 7. The lever 6 is subject to a spring 8, tending to hold it always in the position in which it is shown in the figure. A flexible tube 9 is connected with the cup 3 and extended forwardly and connected with a spout 10, which extends outside of the case A for the outlet of the liquid to be dispensed. A flat plate 11 is secured to and passes through the front wall of the case A. The rear portion of this plate 11 is provided with teeth 12 12, thus forming a rack. Above the plate 11 is a slide 13, which is arranged to slide back and forth upon and above the plate 11, being guided by side guides 14 14 on the latter. The slide 13 is provided with a coin-aperture 15 and also with a button 16. Above the slide 13 is a second plate 17, which is also secured to the front wall of the case A. This plate 17 has a coin-aperture 18. A catch 19 is pivotally connected to the rear end of the plate 11. A coin-box 20 is secured to the inner wall of the case A below the above-described mechanism.

The operation of the device is as follows: A coin is inserted into the coin-openings 18 and 15, resting in the latter. The slide 13 is then pushed inwardly, and in so doing the lever 6 is swung back. As the slide advances and the lever swings the latter moves along the teeth 12 12 until it reaches practically the end of the plate 11, at which point it is moved laterally sufficiently to push it off from the end of the slide 13. The lever thus becomes released and the spring 8 draws it back immediately, so that it slides along the edge of said slide, the latter being subsequently restored to its normal position by hand. The inward movement of the lever 5 lowers the cup 3 into the liquid in the pan 1, so that the cup becomes filled with the liquid to be dispensed. The retraction of the lever 6 elevates the cup, whereupon the liquid which has been filled into it is allowed to run out through the tube 9 and spout 10. It will be seen that if the slide 13 is pushed in without any coin having been inserted the catch 19 will engage one edge of the opening 15 in said slide, thereupon holding it against further movement. Thus operation of the device without the insertion of a coin is prevented. When, on the other hand, the coin is placed in position in said aperture, the catch 19 is held against falling into the aperture by the coin, thus permitting the slide to move past the catch. It will also be seen that the teeth 12 on the plate 11 by engaging the lever 6 as the latter is advanced holds said lever against the backward movement until its full inward movement is completed. Thus tampering with the machine and securing some of the liquid to be dispensed without depositing the coin is prevented, it being necessary to push the slide 13 clear into the end of its path of travel and deposit the coin before the liquid can be secured. The coin, it will be understood, drops through the aperture 21 into the coin-box 20.

It will be understood that changes and modifications may be made in the arrangement herein set forth without departing from the spirit of my invention.

What I claim is—

1. In apparatus of the class specified, the combination of a reciprocating plunger, a lever operated by the plunger, a toothed device for engaging the lever as the plunger is inserted, to prevent retraction of the lever before the same has reached the end of its movement, means whereby the lever is released from the toothed device when the plunger has been given the full extent of its stroke, means for retracting the lever when so released, and liquid-dispensing apparatus arranged to be operated by the lever to dispense liquid by the retraction of the lever after being released, substantially as described.

2. In apparatus of the class specified, the combination of a reciprocating plunger, a lever actuated thereby, a toothed rack 11 adapted to engage the lever, the teeth of said rack being arranged at an inclination, whereby when the plunger has reached the end of its stroke the lever will pass over the side thereof and be free to return along the side edge, spring means tending normally to retract the lever, and liquid-dispensing apparatus operated to dispense the liquid on the return or retracting movement of the lever, substantially as described.

3. In apparatus of the class specified, the combination of a reciprocating plunger, a pivoted lever 6 arranged at the end of the plunger so as to be actuated by the insertion thereof, a toothed plate 11 having teeth 12 arranged at an inclination so that the lever will be engaged during the insertion of the plunger but will be moved to the side edge thereof on the completion of its stroke, and spring means for retracting the lever, substantially as described.

4. In apparatus of the class specified, a plunger having a coin-aperture, a lever operated by said plunger, a rack adapted to be engaged by said lever to prevent backward movement thereof until the plunger has been advanced its full stroke, a reservoir for the liquid to be dispensed, a cup provided with means whereby it is lowered into said reservoir by the inward movement of said plunger and elevated by the outward movement thereof, and an outlet for said cup, substantially as described.

5. In apparatus of the class specified, the combination of a coin-plunger 13 having an aperture 15 for the coin, a plate 11 below said plunger, said plate having an aperture 21 and a rack 12, a pivoted lever 6 adapted to be operated by said plunger 13, a cup 3 connected with the lever 6 by a flexible connector 4, a spring 8 tending normally to retract the lever 6, a reservoir 1 below the cup 3, and a tube 9 extending from the cup 3, substantially as described.

6. In apparatus of the class specified, the combination of a coin-plunger 13 having an aperture 15 for the coin, a plate 11 below said plunger, said plate having an aperture 21 and a rack 12, a pivoted lever 6 adapted to be operated by said plunger 13, a cup 3 connected with the lever 6 by a flexible connector 4, a spring 8 tending normally to retract the lever 6, a reservoir 1 below the cup 3, a tube 9 extending from the cup 3, a coin-receptacle 20, and a catch 18 for engaging the coin-plunger when no coin is inserted.

7. In apparatus of the class specified, the combination with a reciprocating plunger, of means whereby the same is prevented from being inserted without the deposit of a proper coin, a pivoted lever arranged to be operated by the insertion of the plunger, an inclined rack adapted to engage said lever and to prevent the return thereof until the stroke of the plunger is completed and to permit the return on completion of such stroke, and spring means tending to return said lever, substantially as described.

8. In apparatus of the class specified, the combination of a reciprocating plunger 13 having a coin-aperture 15, a coin-lever 19 adapted to engage the aperture 15 when the plunger is inserted without a coin, a plate 11 arranged below the plunger and provided with teeth 12 arranged at an inclination, and a spring tending normally to retract the lever when released by the completion of the plunger-stroke, substantially as described.

9. An apparatus of the class specified comprising a reservoir, a vertically-arranged receptacle for liquid for the reservoir, said receptacle being closed at its upper end and opened at the reservoir, whereby the level of liquid in the latter is maintained uniform, a vertically-movable receptacle arranged to be raised and lowered to be filled with the liquid in the reservoir, said receptacle being provided with an outlet to permit the liquid to be dispensed, a flexible connector carrying said receptacle, a lever to which said connector is attached, a reciprocating plunger for actuating said lever, a spring for retracting the lever, and a rack for holding the lever against the return movement, substantially as described.

In witness whereof I hereunto subscribe my name this 16th day of October, A. D. 1903.

ROY G. TROWBRIDGE.

Witnesses:
A. MILLER BELFIELD,
I. C. LEE.